United States Patent
Chen et al.

(10) Patent No.: US 10,625,728 B2
(45) Date of Patent: *Apr. 21, 2020

(54) MANAGING VEHICLE BRAKE SYSTEM

(71) Applicant: International Business Machines Corporation, Armonk, NY (US)

(72) Inventors: Hao Chen, Beijing (CN); Ya Bin Dang, Beijing (CN); Qi Cheng Li, Beijing (CN); Jian Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/821,310

(22) Filed: Nov. 22, 2017

(65) Prior Publication Data
US 2018/0281770 A1 Oct. 4, 2018

Related U.S. Application Data

(63) Continuation of application No. 15/471,101, filed on Mar. 28, 2017.

(51) Int. Cl.
*B60T 17/22* (2006.01)
*G07C 5/00* (2006.01)
*G07C 5/08* (2006.01)
*B60T 13/66* (2006.01)

(52) U.S. Cl.
CPC ............ *B60T 17/221* (2013.01); *B60T 13/66* (2013.01); *G07C 5/006* (2013.01); *G07C 5/008* (2013.01); *G07C 5/0808* (2013.01); *G07C 5/0841* (2013.01); *B60T 2210/10* (2013.01); *B60T 2210/30* (2013.01)

(58) Field of Classification Search
CPC .................................................... B60T 17/221
See application file for complete search history.

(56) References Cited

U.S. PATENT DOCUMENTS

| | | | |
|---|---|---|---|
| 5,299,452 A * | 4/1994 | Caron | ...................... F16D 66/00 701/70 |
| 6,332,354 B1 | 12/2001 | Lalor et al. | |
| 6,405,117 B1 | 6/2002 | Walenty et al. | |
| 8,078,353 B2 | 12/2011 | Yow et al. | |
| 9,156,460 B2 | 10/2015 | Clark et al. | |
| 10,384,664 B2 * | 8/2019 | Chen | |

(Continued)

OTHER PUBLICATIONS

Office Action dated Aug. 8, 2018, received in a related U.S. Appl. No. 15/471,101.

(Continued)

*Primary Examiner* — Bao Long T Nguyen
*Assistant Examiner* — Michael A Berns
(74) *Attorney, Agent, or Firm* — Scully, Scott, Murphy & Presser, P.C.; Joseph Petrokaitis, Esq.

(57) ABSTRACT

A method for managing a vehicle brake system includes collecting sensor data from one or more sensors in or around the vehicle, calculating brake effectiveness values based on the sensor data, calibrating the brake effectiveness values based on environmental context data associated with the vehicle, accumulating the calibrated brake effectiveness values as a dataset, generating a prediction curve or formula based the dataset, and scheduling a maintenance alarm for the brake system based on the brake effectiveness values.

8 Claims, 8 Drawing Sheets

(56) References Cited

U.S. PATENT DOCUMENTS

| | | |
|---|---|---|
| 2008/0288192 A1 | 11/2008 | Kumar et al. |
| 2010/0188203 A1 | 7/2010 | Wallace et al. |
| 2013/0145833 A1 | 6/2013 | Cahill |
| 2014/0136068 A1 | 5/2014 | Peltz et al. |
| 2017/0291591 A1* | 10/2017 | Steer ................ B60T 8/885 |

OTHER PUBLICATIONS

Synergy, "The KaleidaGraph Guide to Curve", http://synergy.com/Tools/curvefitting.pdf, Accessed on Mar. 27, 2017, pp. 1-32.
List of IBM Patents or Patent Applications Treated as Related, dated Nov. 22, 2017, 2 pages.
Office Action dated Dec. 18, 2018, received in a related U.S. Appl. No. 15/471,101.

* cited by examiner

MANAGING VEHICLE BRAKE SYSTEM

FIELD

The present disclosure relates to managing a vehicle brake system, and more particularly, to assessing vehicle brake effectiveness by sensing data associated with the brake system and providing a maintenance alarm to a driver of the vehicle based on the assessed result.

BACKGROUND

A brake system plays a critical role in vehicle safety. Thus, one should be aware of the current conditions of their vehicle brake system.

SUMMARY

One aspect of the present invention provides a system for managing a brake system of a vehicle. The system includes one or more processors, a memory storing processor-executable program instructions, and one or more sensors coupled to the one or more processors and the memory. The one or more sensors configured to collect data associated with the vehicle. The one or more processors, when executing the program instructions, are configured to collect sensor data from the one or more sensors calculate brake effectiveness values based on the sensor data, and schedule a maintenance alarm based on the calculated brake effectiveness values.

Other aspects of the present invention include a computer-implemented method for managing a brake system of a vehicle. The method includes collecting sensor data from one or more sensors in or around the vehicle, calculating brake effectiveness values based on the sensor data, and scheduling a maintenance alarm for the brake system based on the calculated brake effectiveness values.

Other aspects of the present invention include a computer program product comprising a computer readable storage medium having computer readable program instructions embodied therewith. The computer readable program instructions executable by at least one processor to cause a computer to perform a method for managing a brake system of a vehicle. The method includes collecting sensor data from one or more sensors in or around the vehicle, calculating brake effectiveness values based on the sensor data, and scheduling a maintenance alarm for the brake system based on the calculated brake effectiveness values.

DETAILED DESCRIPTION

Embodiments of the present invention will now be described in detail with reference to the drawings. However, the following embodiments do not restrict the invention claimed in the claims. Moreover, all combinations of features described in the embodiments are not necessarily mandatory for the architecture of the present invention. Like numbers are assigned to like elements throughout the description of the embodiments of the present invention.

According to exemplary embodiments of the present invention, a method, system, and computer product for managing a brake system of a vehicle are provided. A system for managing a brake system of a vehicle according to the present invention is also referred to herein as a "brake maintenance system". The term "vehicle" may be understood to include any moving object with one or more brake systems, such as a car, a truck, an airplane, an auto-bike, or the like.

Figure 1A:
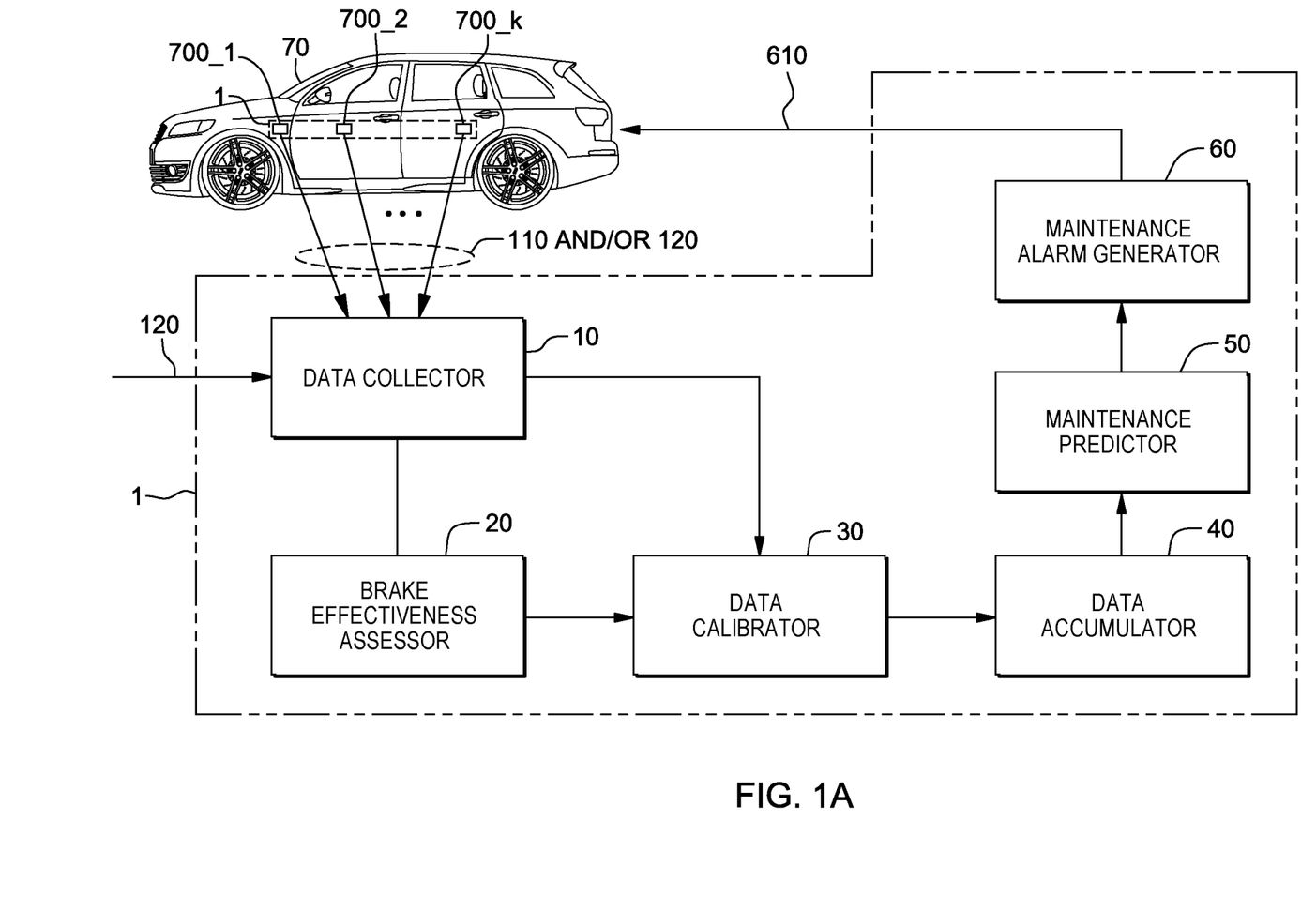
FIG. 1A is a block diagram of a brake maintenance system according to an exemplary embodiment of the present invention.

FIG. 1A is a block diagram of a brake maintenance system 1 according to an exemplary embodiment of the present invention.

As depicted, a brake maintenance system 1 is communicatively coupled to a vehicle 70, which includes one or more sensors 700_1 ... 700_k (where "k" is an integer equal to or greater than 1). In this example, the brake maintenance system 1 is located on-board vehicle 70. The one or more sensors 700_1 to 700_k can be located in and/or around vehicle 70. In some embodiments, environmental context data 120 may be obtained from external sources (not shown). The sensors 700_1 ... 700_k collect vehicle brake system data 110 and environment context data 120 e.g., associated with environmental conditions around vehicle 70.

In some embodiments, the environmental conditions around the vehicle 70 include road conditions such as dusty, stop-and-go traffic, etc.

The brake maintenance system 1 further includes a data collector 10, a brake effectiveness assessor 20, a data calibrator 30, a data accumulator 40, a maintenance predictor 50, and a maintenance alarm generator 60.

The data collector 10 collects the data provided by the sensors 700_1 to 700_k. The data collector 10 provides the collected brake system data 110 to the brake effectiveness assessor 20 and the environmental context data 120 to the data calibrator 30. Further to the above, in some embodiments, the environmental context data 120 may (alternatively or in addition) be obtained by the data collector 10 from one or more external sources (not shown).

The brake effectiveness assessor 20 calculates brake effectiveness values based on the brake system data 110 and provides the brake effectiveness values to the data calibrator 30. The data calibrator 30 calibrates the brake effectiveness values based on environmental context data 120. The data accumulator 40 accumulates the calibrated brake effectiveness values and provides them to the maintenance predictor 50. The maintenance predictor 50 generates a prediction curve or formula based on the accumulated brake effectiveness values. The maintenance predictor 50 may then determine: an appropriate time for maintenance of the vehicle brake system: or need for the maintenance of the vehicle brake system, based on the prediction curve or formula. The maintenance alarm generator 60 may provide a maintenance alarm 610 to the vehicle 70.

In some embodiments, the one or more sensors 700_1 to 700_k may include internet of things (IoTs) sensors to enable remote monitoring of the vehicle brake system with no or reduced human intervention (in real-time), and autonomous transmission of the sensor data to other systems interconnected thereto, such as the brake maintenance system 1.

In some embodiments, part or all of the brake maintenance system 1 may be interconnected remotely with the sensors 700_1 to 700_k through one or more network infrastructures, but in other embodiments, part or all of the brake maintenance system 1 may be locally implemented in/around the vehicle 70. The network infrastructure(s) can include, but are not limited to: wired communication systems based on Internet, local area network(s) (LAN), wide-area network(s) (WAN), or the like, or wireless communications systems based on code division multiple access (CDMA), global system for mobile communication (GSM), wideband CDMA, CDMA-2000, time division multiple access (TDMA), long term evolution (LTE), wireless LAN, Bluetooth, or the like. Thus, in this example, at least one of the data collector 10 may further include a network interface (not shown) (e.g., wireless transmitter or receiver) that supports the above-mentioned communications, so the data collector 10 could receive the sensor data from the sensors 700_1 to 700_k or control signals thereto, if necessary, using the network interface; further, the maintenance alarm generator 60 may include a network interface (not shown) and transmit a signal with the maintenance alarm 610 using the network interface.

In some embodiments, the sensor data may include brake-related sensor data 110 such as a speed variation value of the vehicle 70, a time duration for when the speed variation occurs, a brake pedal path value, a relative relief value, a weight of the vehicle 70, etc., and/or environmental context-related sensor data 120 such as an air temperature, etc.

Figure 1B:
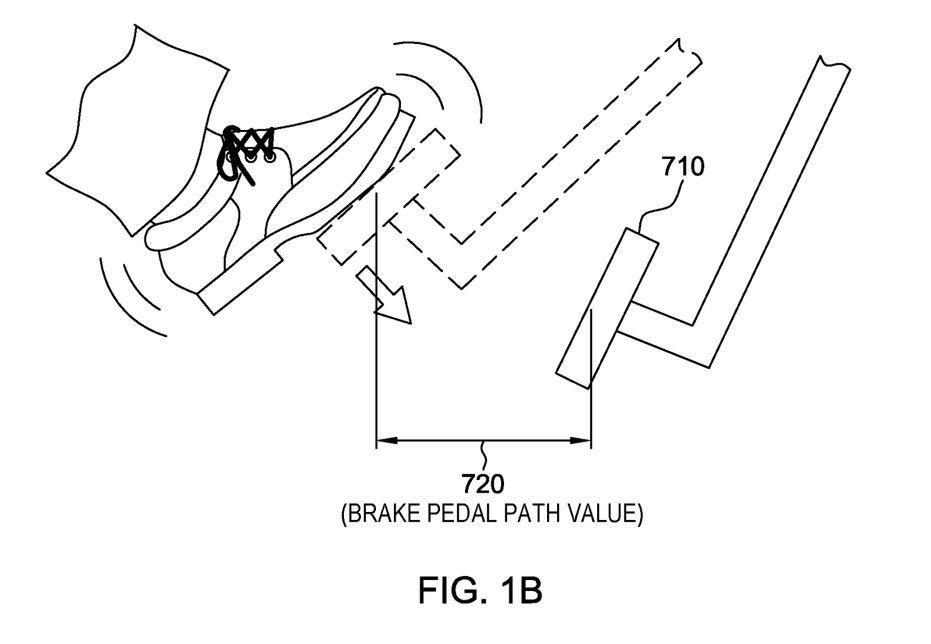
FIG. 1B is an example illustration of a brake pedal path value according to an exemplary embodiment of the present invention.
Figure 1C:
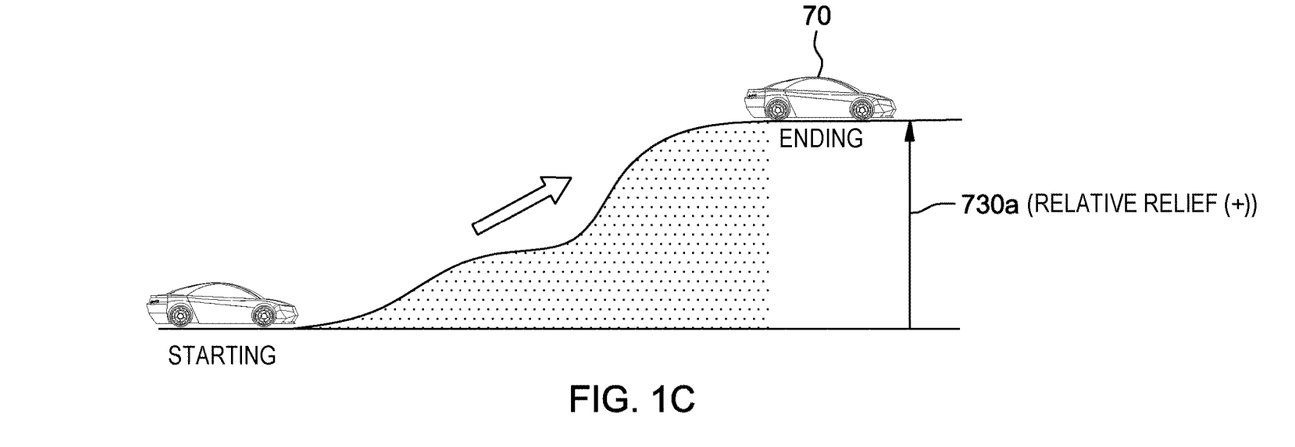
FIGS. 1C and 1D are example diagrams illustrating a relative relief value according to an exemplary embodiment of the present invention.
Figure 1D:
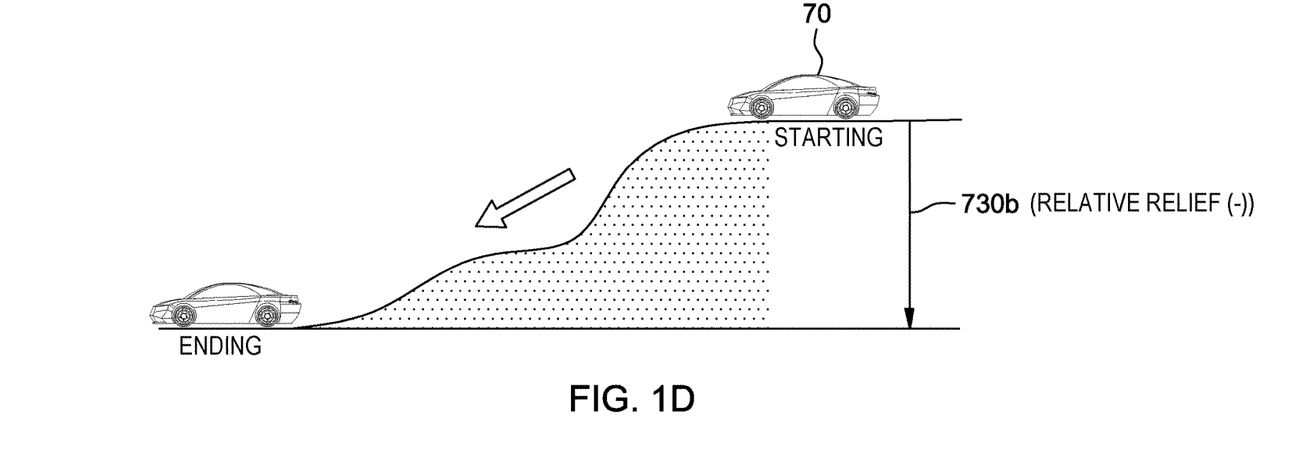

FIG. 1B is an example illustration of a brake pedal path value 720 according to an exemplary embodiment of the present invention. FIGS. 1C and 1D are example diagrams illustrating a relative relief value 730a or 730b according to an exemplary embodiment of the present invention.

Referring to FIG. 1B, the brake pedal path value 720 refers to a movement distance (e.g., 50 millimeters) in, e.g., a horizontal direction of a brake pedal 710 while the braking is driven. Also, the relative relief value (or relative altitude value) refers to a vertical difference (or altitude difference) from a starting location where the braking begins and an ending location where the braking ends, as shown in FIGS. 1C and 1D. Referring to the example of FIG. 1B, if the ending location of the vehicle 70 is at a higher position than the starting location, the relative relief value would be positive. On the other hand, if the ending location of the vehicle 70 is at a lower position than the starting location, the relative relief value would be negative, as shown in FIG. 1C.

The sensors 700_1 to 700_k may include, but are not limited to: a speed sensor for sensing the speed variance of the vehicle 70, a timer for sensing the time duration for when the speed variation occurs, a weight sensor for sensing a weight of the vehicle 70, a thermometer, and a humidity sensor, a speed acceleration sensor etc. The sensors 700_1 to 700_k may further include a brake pedal position sensor and a force pressure sensor for sensing the brake pedal path value and a location sensor (e.g., GPS receiver) and a gyroscope sensor for sensing the relative relief value.

Next, the data collector 10 may provide the collected brake-related sensor data 110 to the brake effectiveness assessor 20. The brake effectiveness assessor 20 may assess a brake effectiveness by calculating brake effectiveness values based on the brake-related sensor data 110. Each brake effectiveness value $E_b$ can be calculated using Equation (1), as follows:

$$E_b = \Delta S \cdot \frac{1}{\Delta T} \cdot \frac{BPP_{max}}{\Delta BPP} \cdot e^{-\Delta RR} \cdot \frac{W}{W_{empty}} \qquad \text{Equation (1)}$$

Here, "·" denotes a multiplication operation. $\Delta S$ is a speed variance of the vehicle 70, $\Delta T$ is a time duration for when the speed variance occurs, $\Delta BPP$ is a brake pedal path value, and $\Delta RR$ is a relative relief value, and W is a weight of the vehicle 70. In addition, $BPP_{max}$ is a maximum obtainable brake pedal path value of the vehicle 70 and $W_{empty}$ is a weight when the vehicle 70 is empty. In some aspects, $\Delta S/\Delta T$ can be sensed using a speed acceleration sensor.

Figure 2:
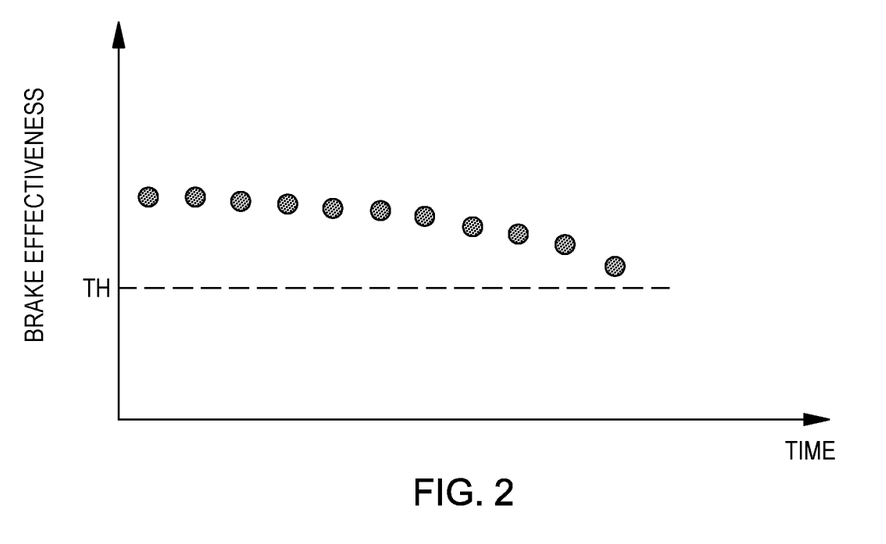
FIG. 2 is an example of brake effectiveness values calculated by a brake effectiveness assessor according to an exemplary embodiment of the present invention.

Referring to the example of FIG. 2, the brake effectiveness values may be calculated along with time. As depicted, the brake effectiveness values may be decreased over time because parts of the brake system may become worn out. If the brake effectiveness value becomes lower than a predetermined threshold value TH, the brake maintenance system 1 may provide an alarm to the vehicle 70, allowing a driver to make real-time monitoring on a status of the brake system and identify a certain time by which the brake system should be maintained or checked-up.

However, the brake effectiveness values may vary depending on environmental conditions surrounding the vehicle 70, such as road surface materials, air temperatures, weather, etc. Thus, the brake maintenance system 1 may further collect environmental context data 120. The environmental context data 120 may include, but are not limited to: material data of a road surface on which the vehicle 70 travels (referred to as a "road surface material data"), air temperature data, and weather data.

le;3qTable 1 shows examples of environmental context data according to an exemplary embodiment of the present invention. Referring to the example shown in Table 1 the road surface material data may include, but are not limited: asphalt, cement, gravel, etc., and the air temperature data may include, but are not limited: mile, cold, hot, etc., and the weather data may include, but are not limited: dry, rain, snow, drizzle, sleet, etc. In some embodiments, the environmental context data 120 may be provided and updated by external sources (not shown) based on a location (e.g., global positioning system (GPS) coordinates) of the vehicle 70. In other embodiments, the air temperature data may be sensed by at least one of the sensors 700_1 to 700_k of FIG. 1A.

TABLE 1

| Road surface material data | Air temperature data | Weather data |
| --- | --- | --- |
| asphalt | mild | dry |
| cement | cold | rain |
| gravel | hot | snow |
| . | . | drizzle |
| . | . | sleet |
| . | . | . |
| | | . |

Referring back to FIG. 1A, the data calibrator 30 may perform calibrations on the brake effectiveness values provided by the brake effectiveness assessor 20 based on the environmental context data 120 where the vehicle 70 travels. In some aspects, the data calibrator 30 may classify each of the brake effectiveness values into a corresponding one of a plurality of data groups given according to the environmental context data 120.

Table 2 shows examples of environmental context data, classification groups, and calibration factors, according to an exemplary embodiment of the present invention. Referring to an example depicted in Table 2, if the environmental context data 120 associated with the vehicle 70 are "asphalt/mild/dry", the data calibrator 30 may classify a corresponding brake effectiveness value into a data group $G_1$; similarly, if the environmental context data 120 are "gravel/cold/snow", the data calibrator 30 may classify the brake effectiveness value into a data group $G_N$. Here, N is an integer equal to or greater than one. For the sake of simplicity, duplicate descriptions for the rest combinations of the environmental context data 120 will be omitted. Given the fact that the brake effectiveness values vary depending on the environmental context data 120, there may occur differences among the brake effectiveness values classified into the data groups. Such differences in the brake effectiveness values among the data groups $G_1$ to $G_N$ may be compensated for by adding a calibration value, which corresponds to the difference, to the before-compensation brake effectiveness value.

TABLE 2

| Environmental Context Data | Classification Groups | Calibration Factors |
| --- | --- | --- |
| asphalt/mild/dry | $G_1$ | $CF_1(=0)$ |
| asphalt/mild/rain | $G_2$ | $CF_2$ |
| asphalt/cold/snow | $G_3$ | $CF_3$ |
| asphalt/cold/dry | $G_4$ | $CF_4$ |
| asphalt/cold/rain | $G_5$ | $CF_5$ |
| asphalt/cold/snow | $G_6$ | $CF_6$ |
| . | . | . |
| . | . | . |
| . | . | . |
| gravel/mild/dry | $G_{N-2}$ | $CF_{N-2}$ |
| gravel/mild/rain | $G_{N-1}$ | $CF_{N-1}$ |
| gravel/cold/snow | $G_N$ | $CF_N$ |

In some embodiments, one of the data groups $G_1$ to $G_N$ may be selected as a reference group into which the brake effectiveness values of other data groups are calibrated. In one example, the data group $G_1$ of "asphalt/mild/dry" where the vehicle 70 may travel the most frequently can be selected as the reference group. Thus, if a brake effectiveness value is provided under environmental context: "asphalt/mild/dry", this brake effectiveness value may be classified into the reference data group $G_1$ and no calibration may be needed. In this case, a corresponding calibration value would be zero. However, if the environmental context is changed to other, calibration may become needed and a corresponding calibration value in this case would not be zero. Thus, in some environment context data, the calibration value is a positive or negative value, but in other environmental context data, it is zero.

Figure 4A:
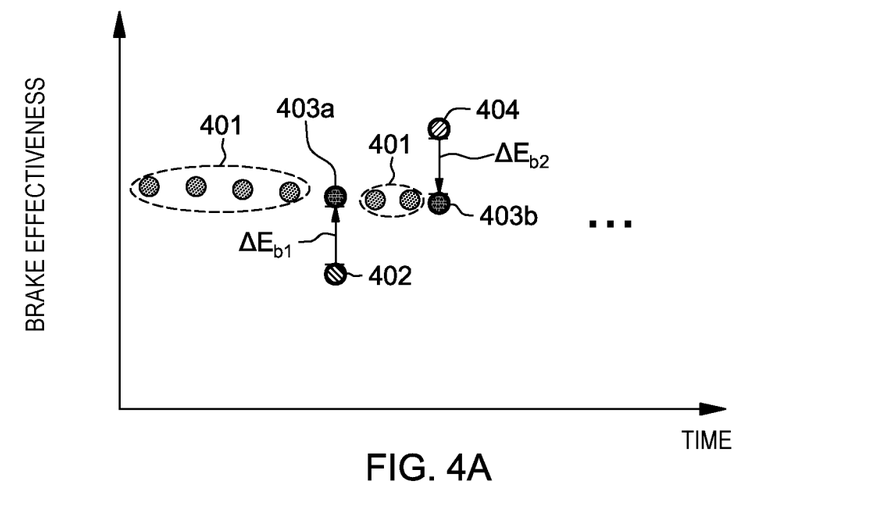
FIG. 4A depicts an example of brake effectiveness calibrations according to an exemplary embodiment of the present invention.

FIG. 4A depicts an example diagram of brake effectiveness calibrations according to an exemplary embodiment of the present invention. Referring to Table 2 and FIG. 4A, it is exemplarily assumed that the vehicle 70 travels at first under the environmental context: "asphalt/mild/dry", then travels under the environmental context: "asphalt/mild/rain", next travels again under the environmental context: "asphalt/mild/dry", and travels under the environmental context: "asphalt/cold/dry". Thus, as depicted in FIG. 4A, the data effectiveness assessor 20 may calculate and provide brake effectiveness values 401 corresponding to the environmental context: "asphalt/mild/dry", which are classified into the reference data group $G_1$ (Table 2); a brake effectiveness value 402 corresponding to the environmental context: "asphalt/mild/rain" which is classified into the reference data group $G_2$ (Table 2); and a brake effectiveness value 404 corresponding to the environmental context: "asphalt/cold/dry" which is classified into the data group $G_4$ (Table 2).

In the example with respect to the brake effectiveness value 402, since a vehicle brake system may have a lower performance in a rainy weather condition than a dry weather condition, the brake effectiveness value 402 under the environmental context: "asphalt/mild/rain" may be lower, by $\Delta E_{b1}$, than it would be under the environmental context: "asphalt/mild/dry". Therefore, this difference $\Delta E_{b1}$ should be compensated for by adding a calibration value of $\Delta E_{b1}$ to the brake effectiveness value 402, thus resulting in a calibrated brake effectiveness value 403a, as shown in FIG. 4A.

In the other example with respect to the brake effectiveness value 404, since it is known that the brake system performance gets better as an air temperature drops, the brake effectiveness value 404 under the environmental context: "asphalt/cold/dry" may show up with a higher value, by $-\Delta E_{b2}$, than it would be under the environmental context: "asphalt/mild/dry". Therefore, this difference $-\Delta E_{b2}$ should be compensated for by adding a calibration value of $-\Delta E_{b2}$ to the brake effectiveness value 404, thus resulting in a calibrated brake effective value 403b, as shown in FIG. 4A.

In some embodiments, the calibration values may be calculated using Equation (2), as follows:

$$E_{bout}=(1+CF) \cdot E_{bin} \quad \text{Equation (2)}$$

Here, $E_{bin}$ is a brake effectiveness value input to the data calibrator 30, $E_{bout}$ is a brake effectiveness value output from the data calibrator 30, and CF is a calibration factor applied to a corresponding data group.

When a brake effectiveness value is classified into one of the data groups $G_1$ to $G_N$, the data calibrator 30 may apply a corresponding calibration factor CF associated with a data group into which the brake effectiveness value is classified. For example, as shown in Table 2, the calibration factor CF may be given as zero (e.g., $CF_1$) for the reference group $G_1$; and the calibration factor CF may be given as $CF_N$ for the group $G_N$ corresponding to the environmental context: "gravel/cold/snow".

In the example with respect to the brake effectiveness value 402 of FIG. 4A, the brake effectiveness value 402 is an input value $E_{bin}$ to the data calibrator 30 and the calibration value $\Delta E_{b1}$ would be given as a product (e.g., $CF_2 \cdot E_{bin}$) of a corresponding calibration factor $CF_2$ and the brake effectiveness value 402; in this example, the calibration factor $CF_2$ is a positive value. Further, in the example of the brake effectiveness value 404 of FIG. 4A, the calibration value $-\Delta E_{b2}$ would be given as a product (e.g., $CF_4 \cdot E_{bin}$) of a corresponding calibration factor $CF_4$ and the brake effectiveness value 404; in this example, the calibration factor $CF_4$ is a negative value.

In some embodiments, the calibration factor CF may be predetermined based on calibration models or curves which are generated based on, e.g., known information and/or data about relationships between each environmental context and the brake system performance.

Figure 3:
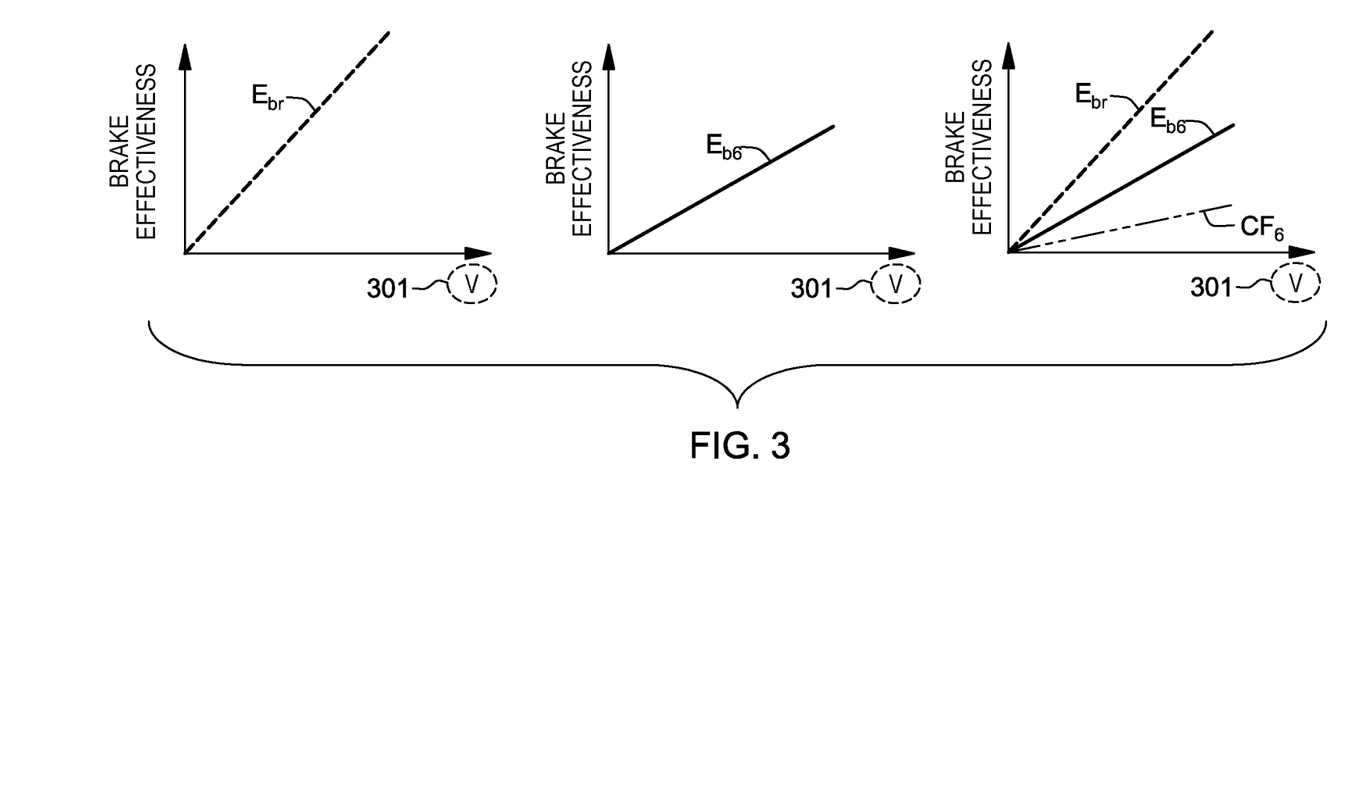
FIG. 3 depicts examples of obtaining calibration factors according to an exemplary embodiment of the present invention.

FIG. 3 depicts an example of obtaining calibration factors according to an exemplary embodiment of the present invention.

In an example shown in FIG. 3, a reference brake effectiveness curve $E_{br}$ and a brake effectiveness curve $E_{b6}$ are a function of a brake effectiveness (y-axis) value and a "v" (x-axis) value 301. The "v" (x-axis) value 301, can represent one of: a speed variation $\Delta S$, a time duration $\Delta T$, a brake pedal path value $\Delta BPP$, a relative relief $\Delta RR$, and a vehicle weight W. In the example of FIG. 3, it is understood that "v" can represent variable values such as speed variation $\Delta S$, time duration $\Delta T$, brake pedal path values $\Delta BPP$, relative relief $\Delta RR$ values, or one or more constant values, such as vehicle weight W.

It is noted that the reference brake effectiveness curve $E_{br}$ and the brake effectiveness curve $E_{b6}$ in the example of FIG. 3 are based on pre-obtained, relationships between environmental context data and brake system performance data. The more the speed variation $\Delta S$, the higher the brake effectiveness value. The brake effectiveness curve $E_{b6}$ may be located at a lower position than the reference brake effectiveness curve $E_{br}$, taking into account the environment context: "asphalt/cold/snow", related to the brake effectiveness curve $E_{b6}$. In the example depicted in FIG. 3, deviations between the brake effectiveness curve $E_{b6}$ and the reference effectiveness curve $E_{br}$ may vary (or increase) according to the speed variation $\Delta S$, so that calibration factors used to calibrate the brake effectiveness curve $E_{b6}$ to the reference effectiveness curve $E_{br}$ may vary accordingly. For example, as depicted, calibration factors may be represented as a calibration curve $CF_6$ which reflects such variations in deviation between the brake effectiveness curve $E_{b6}$ and the reference effectiveness curve $E_{br}$.

The brake maintenance system 1 (FIG. 1A) may calculate the calibration curve $CF_6$ based on the pre-obtained brake effectiveness curves $E_{b6}$ and $E_{br}$ (as follows) and store the calculated calibration curve $CF_6$ in a memory (not shown):

$$CF_6 = E_{br}/E_{b6} - 1 \qquad \text{Equation (3)}$$

Thus, in one example, if brake effectiveness values are provided under the environmental context: "asphalt/cold/snow" (Table 2), the data calibrator 30 may perform calibration on the brake effectiveness values by using the calibration curve $CF_6$.

Referring now to FIG. 1A and Table 2, the brake maintenance system 1 may store brake effectiveness curves associated with the data groups $G_1$ to $G_N$ (Table 2) and calculate calibration curves corresponding to the data groups $G_1$ to $G_N$. The data calibrator 30 may use a corresponding calibration curve for particular environmental context data 120. The data accumulator 40 may accumulate the calibrated brake effectiveness values to generate a prediction curve (or formula) as a function of time.

The data accumulator 40 may store the calibrated brake effectiveness values into a memory (not shown) as a historical dataset. Next, the maintenance predictor 50 may generate a prediction curve (or formula) based on the historical dataset using an algorithm to determine a fitting curve (or formula) that matches to the historical dataset.

In some embodiments, the prediction curve could be determined using curve fitting techniques well known in the art based on, but are not limited to: a Least Squares Curve Fit, a Nonlinear Curve Fit, and a Smoothing Curve Fits.

Figure 4B:
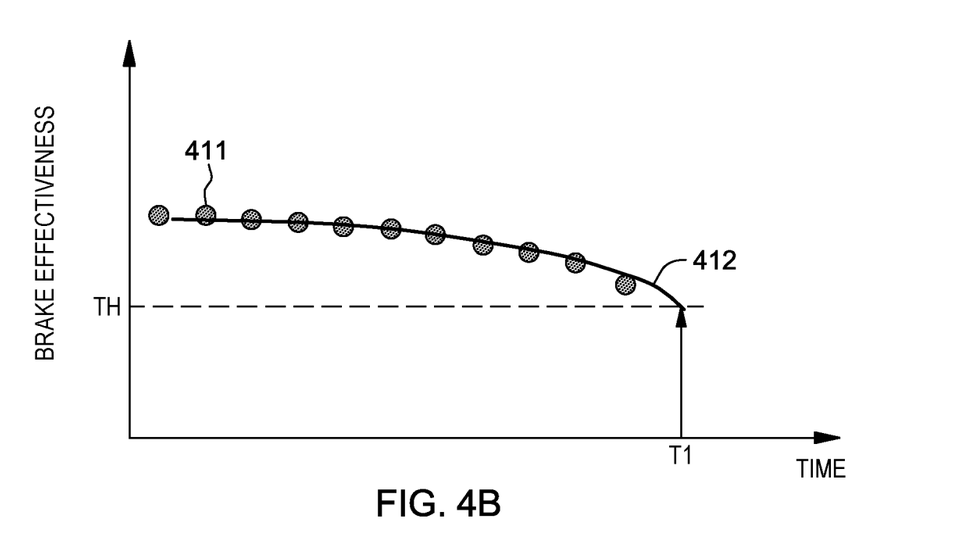
FIG. 4B depicts an example of historical data with a corresponding prediction curve according to an exemplary embodiment of the present invention.

FIG. 4B depicts an example of historical data with a corresponding prediction curve according to an exemplary embodiment of the present invention. As depicted, the maintenance predictor 50 may generate a prediction curve 412 corresponding to the historical dataset 411 and determine that a brake effectiveness value would reach a reference threshold value TH at a time T1 based on the prediction curve 412. For example, the reference threshold value TH may be determined to be a value at which certain faults or deficiency of the brake system begin. Thus, as depicted in FIG. 1A, the maintenance alarm generator 60 may generate and provide a maintenance alarm 610 to the vehicle 70 at a certain time before the time T1. For example, the maintenance alarm 610 may be displayed via a dashboard display (not shown) or a heads-up display (not shown) of the vehicle 70. The maintenance alarm 610 may indicate that servicing/maintenance or check-up for the brake system on the vehicle 70 is needed. In some embodiments, the maintenance alarm 610 may further indicate a condition of the brake system in terms of severity of the faults or deficiency (e.g., low/medium/high, etc.) and/or accordingly, suggest a particular time by which the brake system should be maintained, serviced, or checked up.

In some embodiments, at least one of the data collector 10, the brake effectiveness assessor 20, the data calibrator 30, the data accumulator 40, the maintenance predictor 50, and the maintenance alarm generator 60 may be implemented using a hardware processor (not shown) or based on a field-programmable gate array (FPGA) design (not shown), but in other embodiments, they may be implemented based on program codes which are stored in a memory (not shown) or in a hardware processor and executed by the hardware processor.

Figure 5A:
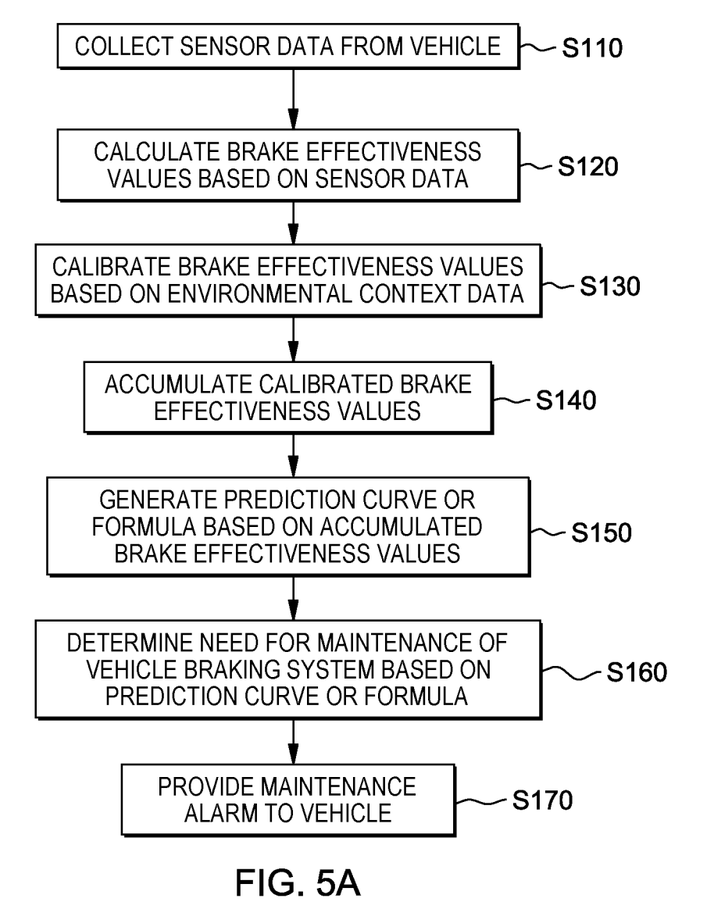
FIG. 5A depicts an example method according to an exemplary embodiment of the present invention.

FIG. 5A depicts an example method according to an exemplary embodiment of the present invention. Referring now to FIGS. 1A and 5A, at step S110, the data collector 10 may collect the sensor data (e.g., brake-related sensor data 110 of FIG. 1) using some of the sensors 700_1 to 700_k located in/around the vehicle 70. The brake effectiveness assessor 20 may calculate brake effectiveness values based on the sensor data (S120) and the data calibrator 30 may calibrate the brake effectiveness values based on the environmental context data 120 (S130). Next, the data accumulator 40 may accumulate the calibrated brake effectiveness values (S140) and the maintenance predictor 50 may generate a prediction curve or formula based on the accumulated brake effectiveness values (S150). The maintenance predictor 50 may then determine: an appropriate time for maintenance of the vehicle brake system; or need for servicing/maintenance of the vehicle brake system based on the prediction curve or formula (S160) and the maintenance alarm generator 60 may provide a maintenance alarm 610 to the vehicle 70 (S170). The maintenance alarm 610 may indicate that servicing/maintenance or check-up for the brake system on the vehicle 70 is needed. In some embodiments, the maintenance alarm 610 may further indicate a condition of the brake system in terms of severity of the faults or deficiency (e.g., low/medium/high, etc.) and/or accordingly, suggest a particular time by which the brake system should be maintained, serviced, or checked up.

Figure 5B:
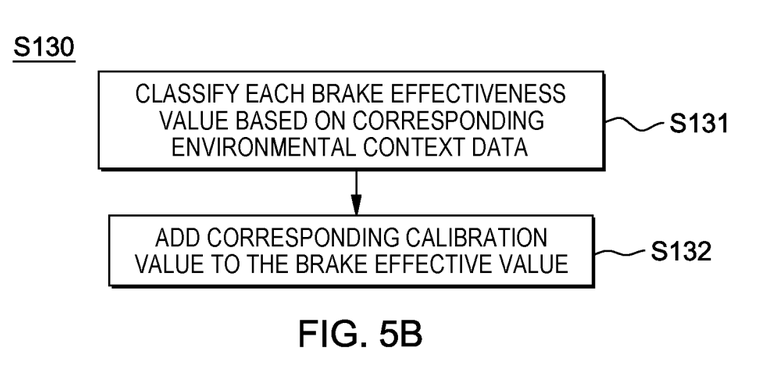
FIG. 5B depicts an example method of calibrating brake effectiveness values according to an exemplary embodiment of the present invention.

FIG. 5B depicts an example method of calibrating brake effectiveness values according to an exemplary embodiment of the present invention.

Referring to FIGS. 1, 5A, and 5B, the step S130 of FIG. 5A may include: classifying each brake effectiveness value into one of data groups $G_1$ to $G_N$ based on the environmental context data 120 (S131) and adding a corresponding calibration value to each brake effectiveness value (S132).

Figure 6:
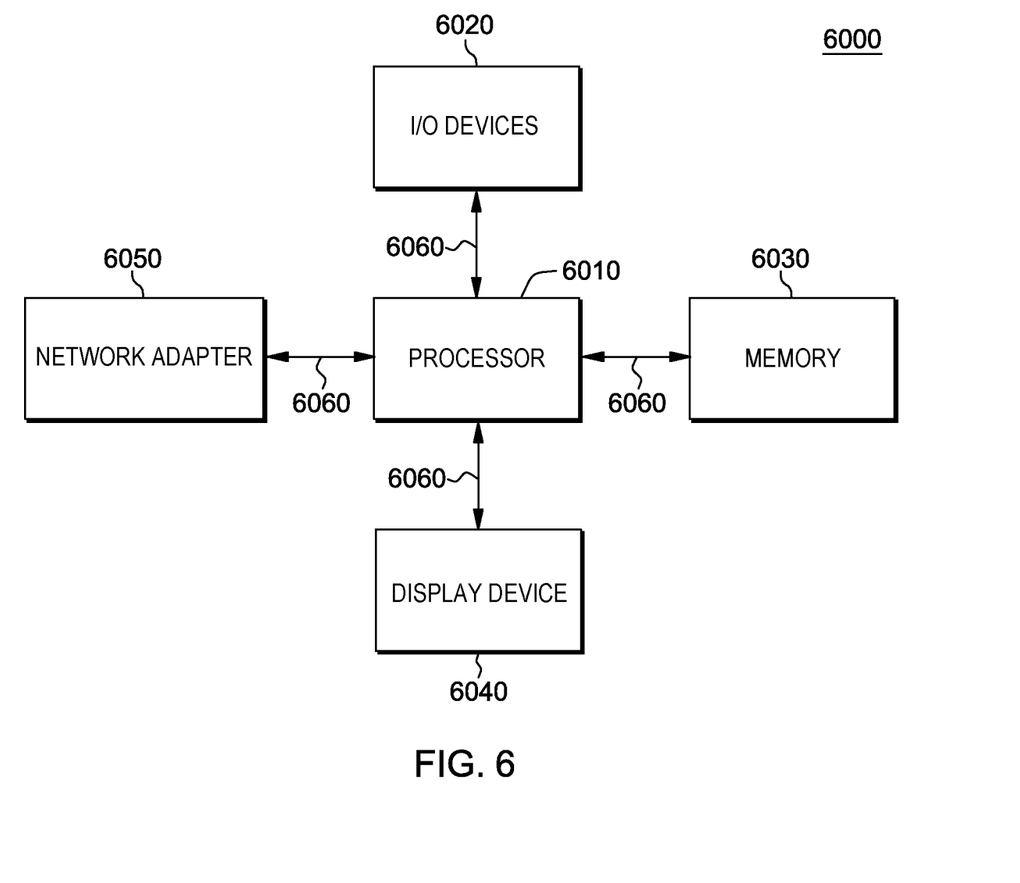
FIG. 6 depicts an example system according to an embodiment of the present invention.

FIG. 6 depicts an example system 6000 according to an exemplary embodiment of the present invention.

Referring to the example depicted in FIG. 6, a computing system 6000 may be used (without limitation) as a platform for performing (or controlling) one or more functions and/or operations described hereinabove with respect to the example brake maintenance system 1 of FIG. 1A, and/or exemplary methods of FIGS. 5A and 5B.

In addition (without limitation), the computing system 6000 may be implemented with an UMPC, a net-book, a PDA, a portable computer (PC), a web tablet, a wireless phone, a mobile phone, a smart phone, an e-book, a PMP, a portable game console, a navigation device, a black box, a digital camera, a DMB player, a digital audio recorder, a digital audio player, a digital picture recorder, a digital picture player, a digital video recorder, a digital video player, or the like.

Referring now specifically to FIG. 6, the computing system 6000 may include a processor(s) 6010, I/O device(s) 6020, a memory 6030, a display device 6040, bus 6060, and network adaptor 6050.

The processor 6010 is operably coupled to and may communicate with and/or drive the I/O devices 6020, memory 6030, display device 6040, and network adaptor 6050 through the bus 6060.

The computing system 6000 can communicate with one or more external devices using network adapter 6050. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The computing system 6000 may also include or access a variety of computing system readable media. Such media may be any available media that is accessible (locally or remotely) by a computing system (e.g., the computing system 6000), and it may include both volatile and non-volatile media, removable and non-removable media.

The memory 6030 can include computer system readable media in the form of volatile memory, such as random access memory (RAM) and/or cache memory or others. The computing system 6000 may further include other removable/non-removable, volatile/non-volatile computer system storage media.

The memory 6030 may include one or more program modules (not shown) for performing (or controlling) one or more of the functions and/or operations described hereinabove with respect to the example shown in FIG. 1A, and/or exemplary methods shown in FIGS. 5A and 5B. For example, the program modules may be embodied as (and/or include) program instructions (software), routines, programs, objects, components, logic, data structures, or the like, for performing particular tasks or implementing particular abstract data types. For example, the processor (e.g., 6010) of the computing system 6000 may execute the program modules (embodied as software) to perform (or control) the functions or operations described hereinabove with respect to the system 1 of FIG. 1A, and/or methods of FIGS. 5A and 5B. The program module may be programmed into the integrated circuits of the processor (e.g., 6010). In some embodiments, the program module may be stored in a memory 6030 of the system 6000 and/or distributed among (or shared between) one or more memory units associated with one or more remote computer system memories (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A computer-implemented method for managing a brake system of a vehicle adapted to travel on a road surface, said method comprising:
   collecting brake-related sensor data from one or more sensors in or around the vehicle while the vehicle travels on said road surface;
   calculating, using one or more processors, brake effectiveness values based on the sensor data;
   using a calibration model by said one or more processors to obtain a calibration factor value, said calibration model generated based on a pre-determined relationships between a environmental context data and said brake-related sensor data associated with the vehicle, said environmental context data including a combination of: road surface material data and a weather precipitation type data;
   applying, by said one or more processors, said obtained calibration factor value to a brake effectiveness value of said calculated brake effectiveness values to calibrate said brake effectiveness value; and
   generating, at said vehicle, a maintenance alarm signal indicating a maintenance time for the brake system based on calibrated brake effectiveness values.

2. The computer-implemented method of claim 1, further comprising:
   accumulating the calibrated brake effectiveness values as a dataset; and
   generating a prediction curve or formula based on the dataset.

3. The computer-implemented method of claim 2, further comprising:
   determining that a brake effectiveness value in the prediction curve or formula reaches a predetermined threshold value; and
   generating the maintenance alarm, in response to reaching the predetermined threshold value.

4. The computer-implemented method of claim 1, wherein the sensor data comprises:
   brake-related sensor data selected from a group including a speed variation of the vehicle, a time duration for when the speed variation occurs, a brake pedal path, a relative relief, and a weight of the vehicle.

5. The computer-implemented method of claim 1, wherein the environmental context data includes air temperature data.

6. The computer-implemented method of claim 5, wherein the road surface material data and the weather data are provided by external sources, and wherein the air temperature data is provided by at least one of the vehicle sensors.

7. The computer-implemented method of claim 1, wherein the calculating a brake effectiveness value comprises: classifying, using one or more processors, the brake effectiveness values into one or more data groups, each group based on a different combination of the environmental context data; and adding, using one or more processors, the calibration factor value to at least one brake effectiveness value, the calibration factor value corresponding to the environment context data group classification.

8. The computer-implemented method of claim 7, wherein the obtaining the calibration factor value comprises: obtaining, using said one or more processors, a respective brake effectiveness function representing a pre-determined relationship between a respective environmental context data and brake-related sensor data; obtaining a reference brake effectiveness function associated with a selected environmental context data group against which the brake effectiveness values of other data groups are calibrated; and generating the calibration factor value based on a deviation between said respective brake effectiveness function and said reference brake effectiveness function.

* * * * *